(12) United States Patent
Kim et al.

(10) Patent No.: US 10,763,947 B2
(45) Date of Patent: Sep. 1, 2020

(54) METHOD AND USER EQUIPMENT FOR EXECUTING BEAM RECOVERY, AND METHOD AND BASE STATION FOR SUPPORTING SAME

(71) Applicant: LG ELECTRONICS INC., Seoul (KR)

(72) Inventors: Kijun Kim, Seoul (KR); Sukhyon Yoon, Seoul (KR); Jiwon Kang, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/579,783

(22) Filed: Sep. 23, 2019

(65) Prior Publication Data

US 2020/0036430 A1 Jan. 30, 2020

Related U.S. Application Data

(63) Continuation of application No. PCT/KR2018/003342, filed on Mar. 22, 2018.

(Continued)

(51) Int. Cl.
*H04B 7/02* (2018.01)
*H04B 7/08* (2006.01)
(Continued)

(52) U.S. Cl.
CPC ......... *H04B 7/088* (2013.01); *H04L 25/0204* (2013.01); *H04W 56/0005* (2013.01);
(Continued)

(58) Field of Classification Search
CPC .. H04B 7/088; H04W 76/28; H04W 56/0005; H04W 72/0413; H04W 72/046;
(Continued)

(56) References Cited

U.S. PATENT DOCUMENTS

2017/0207843 A1* 7/2017 Jung .................... H04B 7/0408
2018/0219604 A1* 8/2018 Lu ........................ H04L 1/1607

FOREIGN PATENT DOCUMENTS

JP        5792580      10/2015
KR      101229196       2/2013
(Continued)

OTHER PUBLICATIONS

PCT International Application No. PCT/KR2018/003342, Written Opinion of the International Searching Authority dated Jul. 16, 2018, 25 pages.

(Continued)

*Primary Examiner* — Zewdu A Kassa
(74) *Attorney, Agent, or Firm* — Lee, Hong, Degerman, Kang & Waimey PC

(57) ABSTRACT

The user equipment transmits a scheduling request by means of a scheduling request channel resource configured in the user equipment for beam recovery when uplink data is generated in the user equipment or when paging data is received therefor from a base station while the user equipment is in a discontinuous reception (DRX) mode. The user equipment receives an uplink grant in response to the scheduling request.

14 Claims, 10 Drawing Sheets

Related U.S. Application Data

(60) Provisional application No. 62/474,621, filed on Mar. 22, 2017.

(51) Int. Cl.

| | | |
|---|---|---|
| *H04W 76/28* | (2018.01) | |
| *H04L 25/02* | (2006.01) | |
| *H04W 56/00* | (2009.01) | |
| *H04W 72/04* | (2009.01) | |
| *H04W 72/12* | (2009.01) | |
| *H04W 74/08* | (2009.01) | |
| *H04W 76/27* | (2018.01) | |

(52) U.S. Cl.
CPC ..... *H04W 72/046* (2013.01); *H04W 72/0413* (2013.01); *H04W 72/1284* (2013.01); *H04W 74/0833* (2013.01); *H04W 76/28* (2018.02); *H04W 76/27* (2018.02)

(58) Field of Classification Search
CPC ......... H04W 72/1284; H04W 74/0833; H04W 76/27; H04L 25/0204
USPC ................ 375/267, 259, 260, 316, 295, 219
See application file for complete search history.

(56) References Cited

FOREIGN PATENT DOCUMENTS

| KR | 101241887 | 3/2013 |
|---|---|---|
| WO | 2016206495 | 12/2016 |

OTHER PUBLICATIONS

Intel, "Scheduling request design for NR", 3GPP TSG RAN WG1 Meeting #88, R1-1702234, Feb. 2017, 5 pages.
Huawei, et al., "WF on Mechanism to Recover from Beam Failure", 3GPP TSG RAN WG1 Meeting #88, R1-1703988, Feb. 2017, 3 pages.
LG Electronics, "Discussion on providing robustness for beamformed systems", 3GPP TSG RAN WG1 NR Ad-Hoc Meeting, R1-1700471, Jan. 2017, 4 pages.
Nokia, et al., "Beam Recovery in NR", 3GPP TSG RAN WG2 Meeting #97, R2-1701681, Feb. 2017, 5 pages.
Nokia, et al., "Beam Recovery in NR", 3GPP TSG RAN WG2 NR Adhoc Meeting, R2-1700075, Jan. 2017, 5 pages.
Mediatek, "Aspects for UE-initiated beam recovery", 3GPP TSG RAN WG1 Meeting #88, R1-1702730, Feb. 2017, 5 pages.
Qualcomm, "Delivery of System information", 3GPP TSG RAN WG2 Meeting #97, R2-1701813, Feb. 2017, 4 pages.
Guangdong Oppo Mobile Telecom, "On Beam Recovery Mechanism", 3GPP TSG RAN WG1 Meeting #88, R1-1701944, Feb. 2017, 4 pages.
NTT Docomo, "Views on mechanism to recover from beam failure", 3GPP TSG RAN WG1 Meeting #88, R1-1702799, Feb. 2017, 4 pages.

\* cited by examiner

METHOD AND USER EQUIPMENT FOR EXECUTING BEAM RECOVERY, AND METHOD AND BASE STATION FOR SUPPORTING SAME

CROSS-REFERENCE TO RELATED APPLICATIONS

This application is a continuation of International Application No. PCT/KR2018/003342, filed on Mar. 22, 2018, which claims the benefit of U.S. Provisional Application No. 62/474,621, filed on Mar. 22, 2017, the contents of which are all hereby incorporated by reference herein in their entireties.

TECHNICAL FIELD

The present invention relates to a wireless communication system. More particularly, the present invention relates to a method and apparatus for performing/supporting a beam recovery process.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of performing a beam recovery procedure by a user equipment (UE) in a wireless communication system. The method includes: generating uplink data at the UE while the UE is in a discontinuous reception (DRX) mode or receiving paging information for the UE from a base station (BS); transmitting a scheduling request channel through a scheduling request channel resource corresponding to one of downlink beams; and receiving an uplink grant as a response to the scheduling request channel In another aspect of the present invention, provided herein is a method of supporting a beam recovery procedure by a base station (BS) in a wireless communication system. The method includes: receiving a scheduling request channel through a scheduling request channel resource corresponding to one of downlink beams from a user equipment (UE) while the UE is in a discontinuous reception (DRX) mode; and transmitting an uplink grant as a response to the scheduling request channel.

In another aspect of the present invention, provided herein is a user equipment (UE) for performing a beam recovery procedure in a wireless communication system. The UE includes a radio frequency (RF) unit, and a processor configured to control the RF unit. The processor is configured to: generate uplink data at the UE while the UE is in a discontinuous reception (DRX) mode or control the RF unit to receive paging information for the UE from a base station (BS); control the RF unit to transmit a scheduling request channel through a scheduling request channel resource corresponding to one of downlink beams; and control the RF unit to receive an uplink grant as a response to the scheduling request channel.

In another aspect of the present invention, provided herein is a base station (BS) for supporting a beam recovery procedure in a wireless communication system. The BS includes a radio frequency (RF) unit, and a processor configured to control the RF unit. The processor is configured to: control the RF unit to receive a scheduling request channel through a scheduling request channel resource corresponding to one of downlink beams from a user equipment (UE) while the UE is in a discontinuous reception (DRX) mode; and control the RF unit to transmit an uplink grant as a response to the scheduling request channel In each aspect of the present invention, the scheduling request channel resource may correspond to an optimal downlink beam measured by the UE among the downlink beams.

In each aspect of the present invention, information indicating respective scheduling request channel resources for a plurality of synchronization signal blocks may be provided to the UE by the BS.

In each aspect of the present invention, the UE may perform measurement for the plural synchronization signal blocks. The scheduling request channel resource may correspond to a synchronization signal block having highest received power among the plural synchronization signal blocks.

In each aspect of the present invention, the UE may perform beam measurement for measuring a measurement reference signal per beam.

In each aspect of the present invention, a beam measurement report for reporting a result of the beam measurement through the uplink grant may be transmitted to the BS by the UE.

In each aspect of the present invention, the measurement reference signal per beam may be a synchronization signal per beam or a channel state measurement reference signal per beam.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
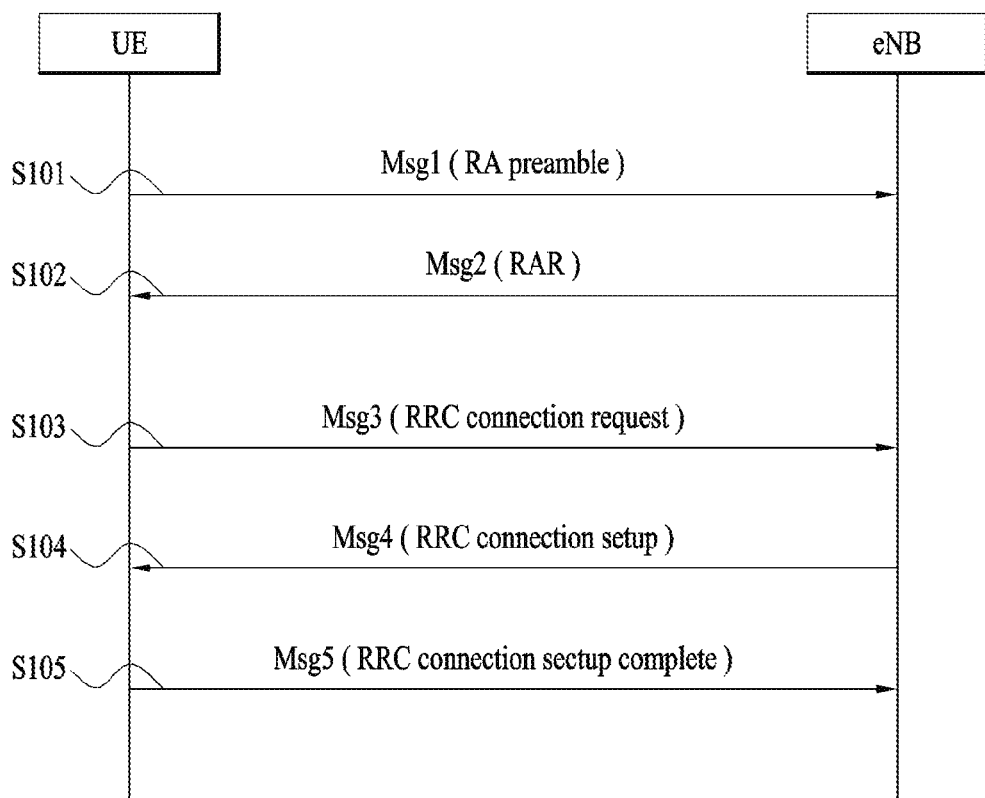
FIG. 1 illustrates a random access procedure in an LTE/LTE-A system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC- FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a physical channel on a specific resource means that the signal of the physical channel is mapped to the specific resource in the procedure of resource mapping of the physical channel, but a portion of the signal mapped to the punctured resource is excluded in transmitting the physical channel In other words, the specific resource which is punctured is counted as a resource for the physical channel in the procedure of resource mapping of the physical channel, a signal mapped to the specific resource among the signals of the physical channel is not actually transmitted. The receiver of the physical channel receives, demodulates or decodes the physical channel, assuming that the signal mapped to the specific resource is not transmitted. On the other hand, rate-matching of a physical channel on a specific resource means that the physical channel is never mapped to the specific resource in the procedure of resource mapping of the physical channel, and thus the specific resource is not used for transmission of the physical channel In other words, the rate-matched resource is not counted as a resource for the physical channel in the procedure of resource mapping of the physical channel The receiver of the physical channel receives, demodulates, or decodes the physical channel, assuming that the specific rate-matched resource is not used for mapping and transmission of the physical channel In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC_CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

An operation to be first performed by the UE to receive services in association with a specific system includes acquiring time and frequency synchronization of the corresponding system, receiving basic system information (SI), and synchronizing uplink timing to an uplink. This procedure will be referred to as an initial access procedure. The initial access procedure generally includes a synchronization procedure and an RACH procedure (that is, random access procedure). In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). For convenience of description, the synchronization procedure in the LTE/LTE-A system will briefly be described again.

PSS: symbol timing acquisition, frequency synchronization, and cell ID detection within cell ID group (three hypotheses).

SSS: cell ID group detection (168 groups), 10 ms frame boundary detection, CP detection (two types).

PBCH decoding: antenna configuration, 40 ms timing detection, system information, system bandwidth, etc.

That is, the UE acquires OFDM symbol timing and subframe timing based on PSS and SSS and also acquires cell ID, and acquires important information in the corresponding system by descrambling and decoding a PBCH using a cell ID. After completing the synchronization procedure, the UE performs the random access procedure. In other words, after the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

The random access procedure is classified into a contention-based procedure and a dedicated (that is, non-contention-based) procedure. The contention-based random access procedure is generally used for initial access, and the dedicated random access procedure is restrictively used for handover. In the contention-based random access procedure, the UE randomly selects RACH preamble sequence. Therefore, a plurality of UEs can transmit the same RACH preamble sequence, whereby a contention resolution procedure is required. On the other hand, in the dedicated random access procedure, the UE uses RACH preamble sequence uniquely allocated to a corresponding UE. Therefore, the UE may perform the random access procedure without contention with another UE.

he contention-based random access procedure includes four steps as follows. Hereinafter, messages transmitted in the steps 1 to 4 may be referred to as 1 to 4 (Msg1 to Msg4).

Step 1: RACH preamble (via PRACH) (UE to eNB)
Step 2: random access response (RAR) (via PDCCH 및 PDSCH) (eNB to UE)
Step 3: layer 2/layer 3 message (via PUSCH) (UE to eNB)
Step 4: contention resolution message (eNB to UE)

The dedicated random access procedure includes three steps as follows. Hereinafter, messages transmitted in steps 0 to 2 may be referred to as messages 0 to 2 (Msg0 to Msg2). As a part of the random access procedure, uplink transmission (that is, step 3) corresponding to RAR may be performed. The dedicated random access procedure may be triggered using a PDCCH (hereinafter, PDCCH order) for commanding RACH preamble transmission.

Step 0: RACH preamble allocation (eNB to UE) through dedicated signaling
Step 1: RACH preamble (via PRACH) (UE to eNB)
Step 2: random access response (RAR) (via PDCCH 및 PDSCH) (eNB to UE)

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access procedure in an LTE/LTE-A system. RRC state is varied depending on RRC connection. The RRC state means whether an entity of RRC layer of a UE is logically connected with an entity of RRC layer of an eNB. The state that the entity of the RRC layer of the UE is connected with the entity of the RRC layer of the eNB means RRC connected state, and the state that the entity of the RRC layer of the UE is not connected with the entity of the RRC layer of the eNB means RRC idle state. The presence of the UE of the idle state is identified in a unit of big zone, and the UE should transition to a connected state (RRC_CONNECTED) to receive a conventional mobile communication service such as voice or data. When a user first turns on a power of the UE, the UE stays in the idle mode in the corresponding cell after searching for a proper cell. The UE stayed in the idle mode establishes an RRC connection with the RRC layer of the eNB through an RRC connection procedure when the RRC connection is required, and transitions to RRC connected state. The RRC connection procedure includes a procedure of transmitting an RRC connection request message from the UE to the eNB, a procedure of transmitting an RRC connection setup message from the eNB to the UE, and a procedure of transmitting an RRC connection setup complete message from the UE to the eNB. Since UL grant is required for transmission of the RRC connection request message, the UE of the idle mode should perform a RACH procedure to acquire UL grant. That is, the UE should transmit an RA preamble (that is, Msg1) (S101) and receive an RAR (that is, Msg2) which is a response to the RA preamble (S102). The UE transmits Msg3, which includes RRC connection request message, to the eNB in accordance with resource allocation information (that is, scheduling information) and a timing advance value within the RAR (S103). If the RRC connection request message is received from the UE, the eNB accepts the RRC connection request of the UE if there are sufficient radio resources, and transmits the RRC connection setup message which is a response message to the UE (S104). If the UE receives the RRC connection setup message, the UE transmits the RRC connection setup complete message to the eNB (S105). If the UE successfully transmits the RRC connection setup complete message, the UE establishes an RRC connection with the eNB and transitions to the RRC connection mode. That is, if the RACH procedure is completed, the UE becomes the state that it is connected with the corresponding cell.

Figure 2:
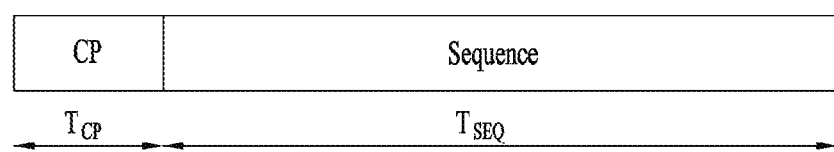
FIG. 2 illustrates a random access preamble format in a legacy LTE/LTE-A system.

FIG. 2 illustrates a random access preamble format in a legacy LTE/LTE-A system.

In the legacy LTE/LTE-A system, a random access preamble, i.e., an RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. The preamble format is controlled by a higher layer. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu (ZC) sequence, the length of the root sequence, and a preamble format, which are to be used for an RACH procedure in the cell. In the 3GPP LTE/LTE-A system, the preamble format and a PRACH opportunity, which is the time when the RACH preamble may be transmitted, are indicated by a PRACH configuration index, which is a part of the RACH configuration information (refer to Section 5.7 of 3GPP TS 36.211 and "PRACH-Config" of 3GPP TS 36.331). The length of the ZC sequence used for the RACH preamble is determined according to the preamble format.

TABLE 1

| Preamble format | $T_{CP}$ | $T_{SEQ}$ |
| --- | --- | --- |
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4 | 448 · $T_s$ | 4096 · $T_s$ |

Figure 3:
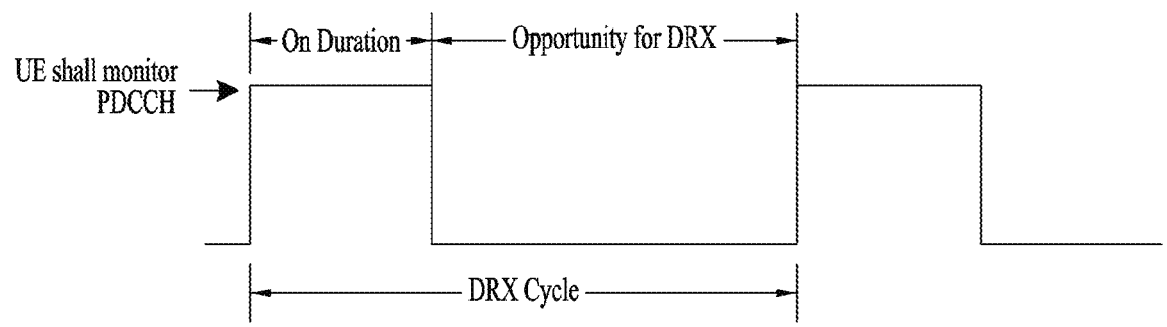
FIG. 3 is a diagram showing a concept of discontinuous reception (DRX).

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB). In the LTE/LTE-A system, a subcarrier spacing $\Delta f$ is 15 kHz or 7.5 kHz. However, a subcarrier spacing $\Delta f_{RA}$ for a random access preamble is 1.25 kHz or 0.75 kHz. FIG. 3 is a diagram showing a concept of discontinuous reception (DRX).

In the LTE/LTE-A system, DRX is performed by a UE to reduce its power consumption due to continuous monitoring of PDCCH, where monitoring implies attempting to decode each of the PDCCHs in a set of PDCCH candidates Without DRX, the UE has to be awake all the time in order to decode downlink data, as the data in the downlink may arrive at any time. This has serious impact on the power consumption of the UE. The UE may be configured by RRC with DRX functionality to control PDCCH monitoring activity of the UE for a cell radio network temporary identifier (C-RNTI), which is a unique identifier used to identify RRC connection and scheduling, a transmit power control (TPC)-PUCCH-RNTI, which is an identifier used for power control of a PUCCH, and (if configured) a semi-persistent scheduling C-RNTI, which is a unique identifier used for semi-persistent scheduling. When in RRC_CONNECTED, if DRX is configured, the UE is allowed to monitor the PDCCH discontinuously using the DRX operation; otherwise the UE monitors the PDCCH continuously. Referring to FIG. 3, if DRX is configured for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle specifies the periodic repetition of the On Duration followed by a possible period of inactivity as shown in FIG. 3.

The UE always monitors a PDCCH during the On Duration in one DRX cycle and a DRX cycle determines a period in which an On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during the On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

RRC controls DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. An eNB provides a UE with DRX configuration information including these parameters through an RRC signaling. UE receives DRX configuration information. A DL HARQ RTT timer per DL HARQ process (except for the broadcast process) and UL HARQ RTT timer per asynchronous UL HARQ process is also defined. onDurationTimer specifies the number of consecutive PDCCH-subframe(s) at the beginning of a DRX Cycle. drx-InactivityTimer specifies the number of consecutive PDCCH-subframe(s) after the subframe in which a PDCCH indicates an initial UL, DL or SL user data transmission for this UE. drx-RetransmissionTimer specifies the maximum number of consecutive PDCCH-subframe(s) until a DL retransmission is received. drx-ULRetransmissionTimer specifies the maximum number of consecutive PDCCH-subframe(s) until a grant for UL retransmission is received. drxStartOffset specifies the subframe where the DRX Cycle starts. drxShortCycleTimer specifies the number of consecutive subframe(s) the UE shall follow the Short DRX cycle. A DL HARQ RTT timer specifies the minimum amount of subframe(s) before a DL HARQ retransmission is expected by the UE. UL HARQ RTT timer specifies the minimum amount of subframe(s) before a UL HARQ retransmission grant is expected by the UE.

The value of each of the timers is defined as the number of subframes. The number of subframes is counted until the value of a timer is reached. If the value of the timer is satisfied, the timer expires. A timer is running once it is started, until it is stopped or until it expires; otherwise it is not running. A timer can be started if it is not running or restarted if it is running. A timer is always started or restarted from its initial value.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event. When a DRX cycle is configured, the Active Time includes the time while:

onDurationTimer or drx-InactivityTimer or drx-RetransmissionTimer or drx-ULRetransmissionTimer or mac-ContentionResolutionTimer is running; or a Scheduling Request is sent on PUCCH and is pending; or an uplink grant for a pending HARQ retransmission can occur and there is data in the corresponding HARQ buffer for synchronous HARQ process; or a PDCCH indicating a new transmission addressed to the C-RNTI of the UE has not been received after successful reception of a Random Access Response for the preamble not selected by the UE.

Herein, mac-ContentionResolutionTimer specifies the maximum number of consecutive PDCCH-subframe(s) that the UE should monitor after Msg3 is transmitted. When DRX is configured, for each subframe, the MAC entity shall:

if a HARQ RTT Timer expires in this subframe and the data of the corresponding HARQ process was not successfully decoded:
   start the drx-RetransmissionTimer for the corresponding HARQ process.

if a DRX Command MAC control element or a Long DRX Command MAC control element is received:
   stop onDurationTimer;
   stop drx-InactivityTimer.

if drx-InactivityTimer expires or a DRX Command MAC control element is received in this subframe:
   stop onDurationTimer;
   stop drx-InactivityTimer.

if drx-InactivityTimer expires or a DRX Command MAC control element is received in this subframe:
   if the Short DRX cycle is configured:
     start or restart drxShortCycleTimer;
     use the Short DRX Cycle.
   else:
     use the Long DRX cycle.

if drxShortCycleTimer expires in this subframe:
    use the Long DRX cycle.
If the Short DRX Cycle is used and {(SFN*10)+subframe number} modulo (shortDRX-Cycle)=(drxStartOffset) modulo (shortDRX-Cycle); or
if the Long DRX Cycle is used and {(SFN*10)+subframe number} modulo (longDRX-Cycle)=drxStartOffset:
    start onDurationTimer.
during the Active Time, for a PDCCH-subframe, if the subframe is not required for uplink transmission for half-duplex FDD UE operation and if the subframe is not part of a configured measurement gap;
    monitor the PDCCH;
    if the PDCCH indicates a DL transmission or if a DL assignment has been configured for this subframe:
        start the HARQ RTT Timer for the corresponding HARQ process;
        stop the drx-RetransmissionTimer for the corresponding HARQ process.
    if the PDCCH indicates a new transmission (DL or UL):
        start or restart drx-InactivityTimer.
when not in Active Time, type-0-triggered SRS (refer to the standard document of 3GPP TS 36.213) is not reported.
if CQI masking (cqi-Mask) is setup by upper layers (e.g. RRC):
    when onDurationTimer is not running, CQI/PMI/RI/PTI on PUCCH is not be reported.
else:
    when in Active Time, CQI/PMI/RI/PTI on PUCCH is not reported.
Regardless of whether the UE is monitoring PDCCH or not, the UE receives and transmits HARQ feedback and transmits type-1-triggered SRS (refer to the standard document of 3GPP TS 36.213).

In the above description, PDCCH-subframe refers to a subframe with PDCCH. For a UE not configured with any TDD serving cell(s), this represents any subframe; for a UE configured with at least one TDD serving cell, if a UE is capable of simultaneous reception and transmission in the aggregated cells, this represents the union over all serving cells of downlink subframes and subframes including DwPTS of the TDD UL/DL configuration indicated by tdd-Config (see 3GPP TS 36.331) parameter provided through an RRC signaling, except serving cells that are configured with schedulingCellId parameter provided through an RRC signaling; otherwise, this represents the subframes where the SpCell is configured with a downlink subframe or a subframe including DwPTS of the TDD UL/DL configuration indicated by tdd-Config.

Recently, as more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The NR system may conform to OFDM parameters other than OFDM parameters of LTE. For example, the NR system may have OFDM numerologies listed in the following table.

TABLE 2

| Parameter | Value |
| --- | --- |
| Subcarrier-spacing (Δf) | 75 kHz |
| OFDM symbol length | 13.33 us |
| Cyclic prefix (CP) length | 1.04 us/0.94 us |
| System bandwidth | 100 MHz |
| No. of available subcarriers | 1200 |
| Subframe length | 0.2 ms |
| Number of OFDM symbol per Subframe | 14 symbols |

Alternatively, the new RAT system uses an OFDM transmission scheme or a similar transmission scheme. The new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell. For example, one or more of OFDM numerologies of the following table may be used in a cell of the NR system. The following table indicates that OFDM numerologies having subcarrier spacings of 30 kHz, 60 kHz, and 120 kHz, which are multiples of 15 kHz, may be used based on a subcarrier spacing of 15 kHz, which has been used in the LTE system. In the following table, a cyclic prefix (CP), system bandwidth, and the number of available subcarriers are purely exemplary and slight modifications to the values listed in the following table may be made. For example, typically, the system bandwidth for a subcarrier spacing of 60 kHz may be set to 100 MHz and, in this case, the number of available subcarriers may be a value which exceeds 1500 and is less than 1666. In the following table, the subframe length and the number of OFDM symbols per subframe are purely exemplary and may be defined to have other values.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |

TABLE 3-continued

| Parameter | Value | Value | Value | Value |
|---|---|---|---|---|
| Cyclic Prefix(CP) length | 5.20 us/4.69 us | 2.60 us/2.34 us | 1.30 us/1.17 us | 0.65 us/0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

<Subframe structure> In the 3GPP LTE/LTE-A system, radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 4:
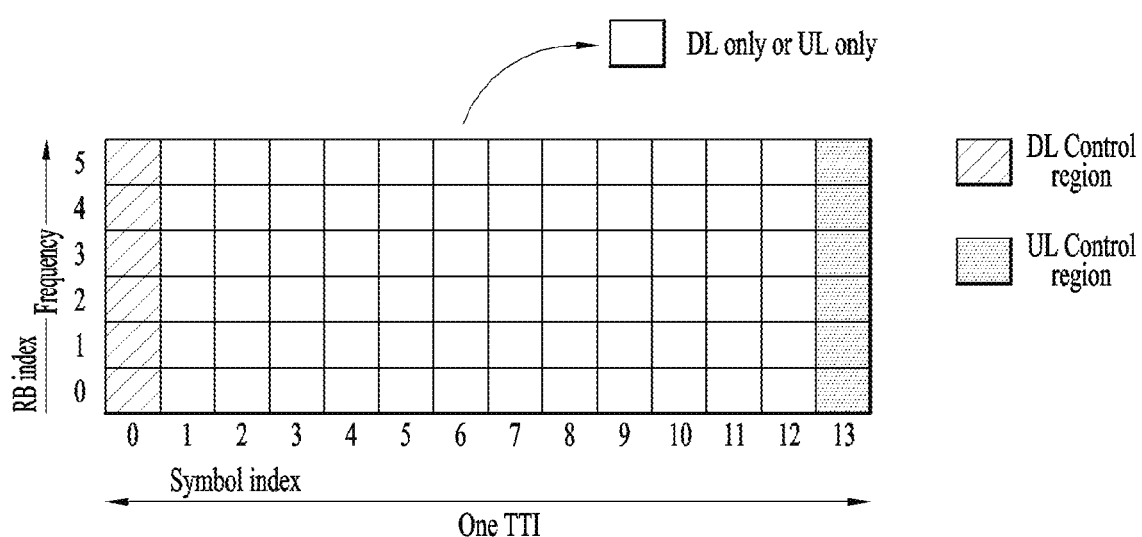
FIG. 4 illustrates a slot structure available in a new radio access technology (NR).

FIG. 4 illustrates a slot structure available in a new radio access technology (NR).

To minimize data transmission latency, in a 5G new RAT, a slot structure in which a control channel and a data channel are time-division-multiplexed is considered.

In FIG. 4, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 4, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 4, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing. In the NR system, a scheduler assigns a radio resource in a unit of TTI (e.g. one mini-slot, one slot, or a plurality of slots.

<Analog Beamforming>

In a recently discussed 5G mobile communication system, a method of using an ultra-high band, i.e., a millimeter frequency band of 6 GHz or above, is being considered to transmit data to a plurality of users in a wide frequency band while maintaining a high transmission rate. This system is named NR in 3GPP and will hereinbelow be referred to as an NR system in the present invention. However, since the millimeter frequency band uses too high a frequency band, a frequency characteristic thereof exhibits very sharp signal attenuation depending on distance. Therefore, in order to correct a sharp propagation attenuation characteristic, the NR system using a band of at least 6 GHz or above uses a narrow beam transmission scheme to solve coverage decrease caused by sharp propagation attenuation by transmitting signals in a specific direction, rather than in all directions, so as to focus energy. However, if a signal transmission service is provided using only one narrow beam, since a range serviced by one gNB becomes narrow, the gNB provides a broadband service by gathering a plurality of narrow beams.

In the millimeter frequency band, i.e., the millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5 lambda (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which a gNB or a UE transmits the same signals with appropriate phase differences through a large number of antennas, thereby increasing energy only in a specific direction. Such BF schemes include digital BF for generating a phase difference between digital baseband signals, analog BF for generating a phase difference between modulated analog signals using time latency (i.e., cyclic shift), and hybrid BF using both digital BF and analog BF. If a transceiver unit (TXRU) is provided to enable transmit power control and phase control per antenna element, independent BF per each frequency resource is possible. However, installation of TXRUs for all of the about 100 antenna elements is less feasible in terms of cost. That is, numerous antennas are needed to correct the sharp propagation attenuation characteristic for the millimeter frequency band and digital BF requires as many radio frequency (RF) components (e.g., digital-to-analog converters (DACs), mixers, power amplifiers, and linear amplifiers) as the number of antennas. As a result, implementation of digital BF in the millimeter frequency band faces the problem of increasing cost of communication devices. Hence, in the case in which a large number of antennas are used as in the millimeter frequency band, use of an analog BF scheme or a hybrid BF scheme is considered. In the analog BF scheme, a plurality of antenna elements is mapped to one TXRU and the direction of a beam is controlled by an analog phase shifter. This analog BF scheme may make only one beam direction in the whole band and, thus, may not perform frequency selective BF, which is disadvantageous. Hybrid BF uses B TXRUs which are fewer in number than Q antenna elements as an intermediate type of digital BF and analog BF. In hybrid BF, the number of beam directions in which beams may be transmitted at the same time is limited to B or less, which depends on a connection method of B TXRUs and Q antenna elements.

As mentioned earlier, digital BF may simultaneously transmit or receive signals in multiple directions using multiple beams by processing a digital baseband signal to be transmitted or received. In contrast, analog BF cannot simultaneously transmit or receive signals in multiple directions beyond a range covered by one beam by performing BF in a state in which an analog signal to be transmitted or received is modulated. Typically, the gNB simultaneously performs communication with multiple users using broadband transmission or multi-antenna characteristics. If the gNB uses analog or hybrid BF and forms an analog beam in one beam direction, the gNB is allowed to communicate only with users included in the same analog beam direction due to the characteristics of analog BE An RACH resource allocation method and a resource utilization method of the gNB according to the present invention to be described later are proposed in consideration of constraints resulting from the characteristics of analog BF or hybrid BF.

<Hybrid Analog Beamforming>

Figure 5:
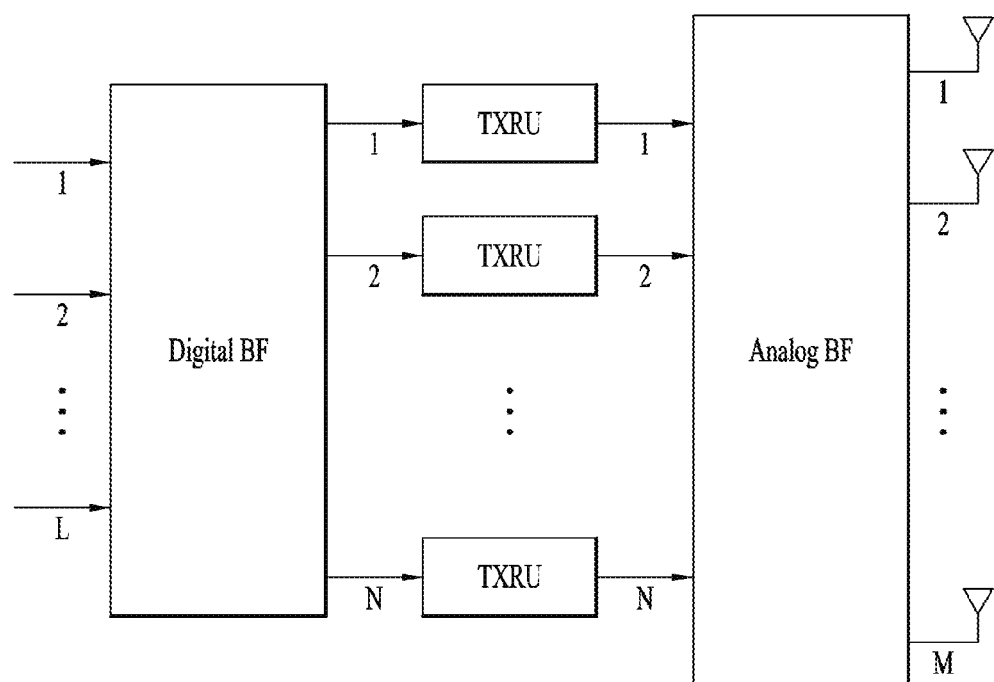
FIG. 5 abstractly illustrates transceiver units (TXRUs) and a hybrid beamforming structure in terms of physical antennas.

FIG. 5 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 5, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 6:
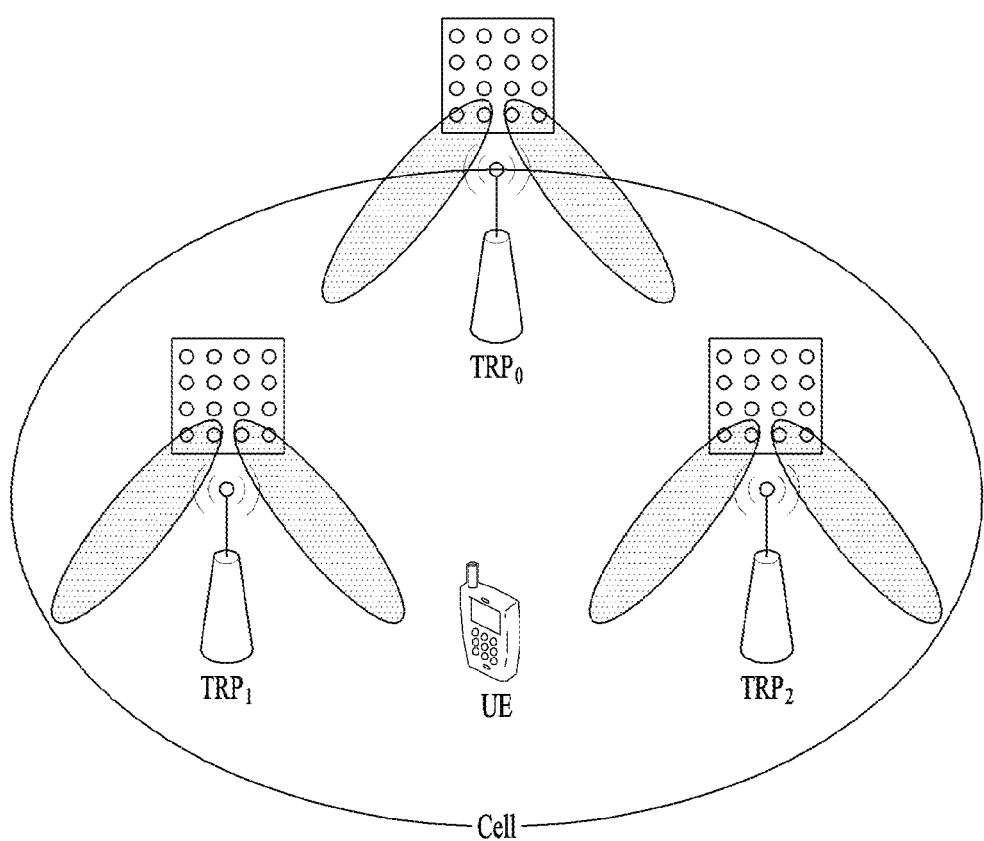
FIG. 6 illustrates a cell of a new radio access technology (NR) system.

FIG. 6 illustrates a cell of a new radio access technology (NR) system.

Referring to FIG. 6, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

Figure 7:
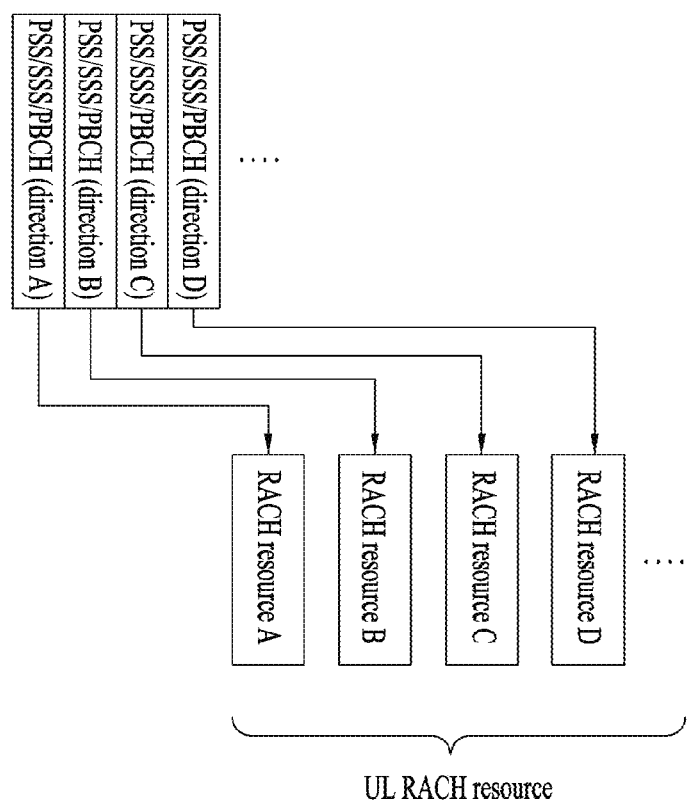
FIG. 7 illustrates transmission of a synchronization signal (SS) block and an RACH resource linked to the SS block.

FIG. 7 illustrates transmission of an SS block and an RACH resource linked to the SS block.

In order to communicate with one UE, the gNB should acquire an optimal beam direction between the gNB and the UE and continue to track the optimal beam direction because the optimal beam direction will be changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is necessary for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the NR which is under development, a multi-stage beam acquisition procedure is being discussed for beam acquisition in an environment using multiple beams. In the multi-stage beam acquisition procedure, the gNB and the UE perform connection setup using a wide beam in an initial access stage and, after connection setup is completed, the gNB and the UE perform communication with optimal quality using a narrow beam. While a variety of schemes is discussed for beam acquisition of the NR system to be mainly discussed in the present invention, the most hotly discussed scheme at present is as follows.

1) The gNB transmits a synchronization block per wide beam so as to cause the UE to search for the gNB in an initial access procedure, i.e., perform cell search or cell acquisition, and search for an optimal wide beam to be used in the first stage of beam acquisition by measuring channel quality of each wide beam. 2) The UE performs cell search upon a synchronization block per beam and performs DL beam acquisition using a cell detection result of each beam. 3) The UE performs an RACH procedure in order to inform the gNB that the UE will access the gNB that the UE has discovered. 4) The gNB connects or associates the synchronization block transmitted per beam and an RACH resource to be used for RACH transmission, in order to cause the UE to inform the gNB of a result of the RACH procedure and simultaneously a result of DL beam acquisition (e.g., a beam index) at a wide beam level. If the UE performs the RACH procedure using an RACH resource connected to an optimal beam direction that the UE has discovered, the gNB obtains information about a DL beam suitable for the UE in a procedure of receiving an RACH preamble.

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

Acquisition and maintenance of a set of beams for transmission and reception in the gNB and the UE are referred to as beam management. In other words, beam management refers to a set of L1/L2 procedures to acquire and maintain a set of beams of TRP(s) and/or UE beams that may be used for DL and UL transmission/reception. Beam management includes at least the following aspects:

Beam determination for the TRP(s) or the UE to select Tx/Rx beam(s) thereof;

Beam measurement for the TRP(s) or the UE to measure characteristics of received beamformed signals;

Beam reporting for the UE to report information of beamformed signal(s) based on beam measurement; and/or Beam sweeping which is an operation of covering a spatial area, with beams transmitted and/or received during a time interval in a predetermined way.

The following DL L1/L2 beam management procedures are supported in one or multiple TRPs:

P-1: This procedure is used to enable UE measurement on different TRP Tx beams to support selection of TRP Tx beams/UE Rx beam(s). For beamforming at the TRP, P-1 typically includes intra/inter-TRP Tx beam sweep from a set of different beams. For beamforming at the UE, P-1 typically includes UE Rx beam sweep from a set of different beams.

P-2: This procedure is used to enable UE measurement on different TRP Tx beams to possibly change inter/intra-TRP Tx beam(s). P-2 may be used for beams from a possibly smaller set of beams for beam refinement than in P-1. P-2 is a special case of P-1.

P-3: This procedure is used to enable UE measurement on the same TRP Tx beam to change a UE Rx beam when the UE uses beamforming.

At least network triggered aperiodic beam reporting is supported under P-1, P-2, and P-3 related operations. UE measurement based on an RS for beam management (at least a CSI-RS) is composed of K(=the total number of configured beams) beams and the UE reports measurement results of N selected Tx beams. Herein, N is not always a fixed number. A procedure based on an RS for the purpose of mobility is not precluded. If N<K, reporting information at least includes measurement quantities for N beam(s) and information indicating N DL Tx beam(s). Particularly, if the UE is configured with K' non-zero power (NZP) CSI-RS resources (where K'>1), the UE may report N' CSI-RS resource indicators (CRIs) (see 3GPP TS 38.214). The UE may be configured with the following higher layer (e.g., RRC) parameters for beam management: N reporting settings (where N≥1) and M resource settings (where M>1). Links between the reporting settings and the resource settings are configured in an agreed CSI measurement setting. CSI-RS based P-1 and P-2 are supported with the resource and reporting settings. P-3 may be supported with or without the reporting settings. A reporting setting at least includes information indicating selected beam(s), L1 measurement reporting, time-domain behavior (e.g., aperiodic, periodic, or semi-persistent), and frequency-granularity if multiple granularities are supported, A resource setting may at least include a time-domain behavior (e.g., aperiodic, periodic, or semi-persistent), an RS type (at least an NZP CSI-RS), and at least one CSI-RS resource set each having K CSI-RS resources (where K≥1). Some parameters of the K CSI-RS resources (e.g., a port number, time-domain behavior, and, density and periodicity if any) may be equal. At least the following two alternatives are supported for beam reporting.

Alt1:

The UE reports information about TRP Tx beam(s) that may be received using selected UE Rx beam set(s). Herein, the Rx beam set refers to a set of UE Rx beams used to receive a DL signal. How to construct the Rx beam set is a UE implementation issue. As one example, each Rx beam in a UE Rx beam set corresponds to a selected Rx beam in each panel. For UEs having more than one UE Rx beam set, the UE may report TRP Tx beam(s) and an identifier of an associated UE Rx beam set per reported Tx beam(s). Different TRP Tx beams reported for the same Rx beam set may be simultaneously received at the UE. Simultaneous reception of different TRP Tx beams reported for different UE Rx beam sets may not be possible at the UE.

Alt2:

The UE reports information about TRP Tx beam(s) per UE antenna group. Herein, the UE antenna group refers to a UE antenna panel or subarray. For UEs having more than one UE antenna group, the UE may report TRP Tx beam(s) and an identifier of an associated UE antenna group per reported TX beam. Different Tx beams reported for different antenna groups may be simultaneously received at the UE. Simultaneous reception of different TRP Tx beams reported for the same UE antenna group may not be possible at the UE.

The NR system supports the following beam reporting considering L groups (where L>1) and each antenna group refers to the Rx beam set (Alt1) or the UE antenna group (Alt2) depending on which alternative is adopted. For each group l, the UE reports at least the following information: information indicating a group at least for some cases; measurement quantities for $N_1$ beam(s); RSRP and CSI report (when a CSI-RS is used for CSI acquisition); and/or information indicating $N_1$ DL Tx beam(s) when applicable. Such group based beam reporting is configurable per UE basis. The group based beam report may be turned off on a per UE basis, for example, when L=1 or $N_1$=1. If the group based beam report is turned off, no group identifier is reported.

The NR system supports the UE capable of triggering a mechanism to recover from beam failure. A beam failure event occurs when the quality of a beam pair link(s) of an associated control channel is sufficiently low (e.g., comparison with a threshold or time-out of an associated timer). The mechanism to recover from beam failure is triggered when beam failure arises. Herein, the beam pair link is used for convenience and may or may not be used in specification. The network explicitly configures the UE with resource(s) for UL transmission of signals for the purpose of recovery. Configurations of the resources are supported in a place in which the gNB is listening from all or partial directions, for example, in a random access region. UL transmission/resources for reporting beam failure may be located in the same time instance as a PRACH (resources orthogonal to PRACH resources) or in a time instance (configurable for the UE) different from the PRACH. Transmission of a DL signal is supported to allow the UE to monitor beams for identifying new potential beams.

The NR system supports beam management with or without beam related indication. If the beam related indication is provided, information pertaining to UE-side beamforming/reception procedure used for CSI-RS based measurement may be indicated to the UE through quasi co-location (QCL). The NR system supports using the same or different beams in transmission of a control channel and transmission of a data channel corresponding to the control channel For NR-PDCCH transmission supporting robustness against beam pair link blocking, the UE may be configured to simultaneously monitor NR-PDCCHs on M beam pair links. Herein, M≥1 and the maximum value of M may depend on at least UE capability. The UE may be configured to monitor NR-PDCCHs on different beam pair link(s) in different NR-PDCCH OFDM symbols. Parameters related to UE Rx beam setting for monitoring the NR-PDCCHs on a plurality of beam pair links are configured by higher layer signaling or a media access control (MAC) control element (CE) and/or are considered in search space design. At least, the NR system supports indication of spatial QCL assumption between DL RS antenna port(s), and DL RS antenna port(s) for demodulating a DL control channel Candidate signaling methods for beam indication for the NR-PDCCH (i.e., configuration method for monitoring the NR-PDCCH) include MAC CE signaling, RRC signaling, downlink control information (DCI) signaling, a specification-transparent and/or implicit method, and a combination of these signaling methods. In some cases, indication may not be necessary.

To receive a unicast DL data channel, the NR system supports indication of spatial QCL assumption between DL RS antenna port(s), and DMRS antenna port(s) for a DL data channel. Information indicating the RS antenna port(s) is indicated via DCI (e.g., a DL grant). The information indicates RS antenna port(s) QCLed with DMRS antenna port(s). A different set of DMRS antenna port(s) for the DL data channel may be indicated as QCL with a different set of RS antenna port(s). In some case, the indication may not be necessary.

In a legacy LTE system, if the UE is in an RRC_IDLE state over an access network, the UE is in an ECM_IDLE state over a core network and, if the UE is in an RRC_CONNECTED state over the access network, the UE is in an ECM_CONNECTED state over the core network. In other words, in the legacy LTE system, the UE in RRC_IDLE corresponds to the UE in ECM_IDLE and the UE in RRC_CONNECTED corresponds to the UE in ECM_CONNECTED. In the case of the UE in IDLE, logical S1-application protocol (S1-AP) signaling connection (over S1-MME) and all S1 bearers (in S1-U) for the UE are not present. In the case of the UE in IDLE, in terms of a network, S1 signaling and RRC connections with the UE plane have not been established or have been released in a control plane, and a DL S1 bearer and a data radio bearer (DRB) with the UE plane have not been established or have been released in a user plane. In terms of the UE in IDLE, the IDLE state means that RRC connection and the DRB thereof are not present in each of the control plane and the user plane. For example, when connection is released once through a connection release procedure, ECM connection between the UE and an MME is released and all contexts associated with the UE are deleted in the eNB. Then, the UE transitions to ECM_IDLE from ECM_CONNECTED in the UE and the MME and transitions to ECM_IDLE from RRC_CONNECTED in the UE and the eNB. For this reason, connection control with the UE always needs to be performed by the core network and paging for the UE needs to be initiated and managed by the core network. Therefore, traffic transport between the UE and the network may be delayed. If the UE in RRC_IDLE intends to transmit traffic or the network intends to transmit traffic to the UE in RRC_IDLE, the UE transitions to RRC_CONNECTED through a service request procedure. The service request procedure includes exchange of various messages. Then, traffic transport between the UE and the network may be delayed. To reduce delay generated in a transition procedure between RRC_IDLE and RRC_CONNECTED, introducing an RRC_INACTIVE state to the LTE-A system has been discussed and, even in the 5G system, support of the RRC_INACTIVE state is under consideration. For example, an RRC layer of the 5G system may support three states having the following characteristics (see 3GPP TR 38.804 V0.7.0).

RRC_IDLE
    Cell re-selection mobility;
    Paging is initiated by a core network (CN);
    A paging area is managed by the CN.
RRC_INACTIVE:
    Cell-reselection mobility;
    CN-NR RAN connection (both in a control plane and in a user plane) has been established for the UE;
    A UE access stratum (AS) context is stored in at least one gNB and the UE;
    Paging is initialized by a NR radio access network (RAN);
    A RAN-based notification area is managed by the NR RAN;
    The NR RAN knows the RAN-based notification area to which the UE belongs;
RRC_CONNECTED:
    The UE has NR RRC connection;
    The UE has an AS context in NR;
    The NR RAN knows a cell to which the UE belongs;
    Transfer of unicast data to/from the UE;
    Network controlled mobility, i.e., handover within NR BS to/from an E-UTRAN.

Figure 8:
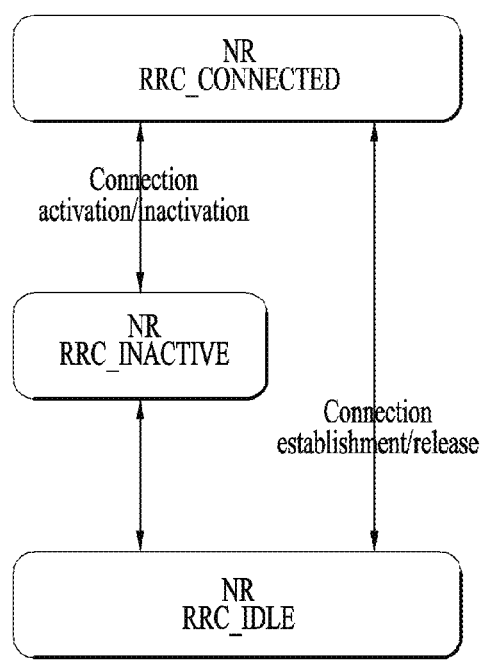
FIG. 8 illustrates UE state transitions. A UE has only one RRC state at one time.

FIG. 8 illustrates UE state transitions. The UE has only one RRC state at one time.

Referring to FIG. 8, the following state transitions are supported between RRC states: from RRC_IDLE to RRC_CONNECTED, following a "connection setup" procedure (e.g., request, setup, and completion); from RRC_CONNECTED to RRC_IDLE, following (at least) a "connection release" procedure; from RRC_CONNECTED to RRC_INACTIVE, following a "connection inactivation" procedure; and from RRC_INACTIVE to RRC_CONNECTED, following a "connection activation" procedure.

The UE in RRC_INACTIVE may be configured with the RAN-based notification area, whereupon: the notification area may cover a single cell or multiple cells and may be smaller than a CN area; the UE does not transmit any "location update" indication when the UE stays within the boundaries of the notification area; and the UE updates the location thereof to the network if the UE leaves the notification area.

<Beam Maintenance During DRX in RRC_CONNECTED>

The present invention proposes a method of performing beam maintenance by a UE in a DRX mode of an RRC_CONNECTED state.

In the case in which transmission/reception data is not temporarily present in the RRC_CONNECTED state, the UE operates in the DRX mode in order to reduce battery consumption thereof while maintaining connection. In the DRX mode, an active time duration (e.g., "On duration") in which the UE should monitor/receive a PDCCH and a time duration (e.g., "possible inactive" duration) in which a transmitter/receiver may be inactivated appear periodically. Even in the "possible inactive" duration, the UE needs to transmit a scheduling request (SR) and monitor the PDCCH to receive a UL grant, when UL data occurs. A system using multiple beams by technology of analog BF etc. as in mmW performs a beam maintenance procedure to maintain best transmission/reception beams. The beam maintenance procedure includes a beam measurement procedure and a beam reporting procedure. For beam maintenance, the UE measures the reference signal received power (RSRP) (or channel quality indicator (CQI)) of a measurement RS per beam. If a measurement result satisfies a predetermined condition, the UE transmits an SR for reporting and a UL channel is allocated to the UE as a response to the SR. The UE reports the measurement result through the allocated UL channel. Alternatively, the UE may measure the measurement RS per beam and report the measurement result through a preconfigured periodic UL channel. The gNB may determine whether to change a serving beam based on reporting from the UE and inform the UE of the determination. Hereinbelow, the measurement RS per beam will be referred to as an MRS. However, RSRP per beam may be measured using a synchronization signal (SS) or a CSI-RS.

In Proposal 1 of the present invention regarding beam maintenance during DRX in RRC_CONNECTED, the UE performs a beam maintenance procedure regardless of "On duration" in the DRX mode of the RRC_CONNECTED state. That is, even in the "possible inactive" duration, the UE operates the receiver at an MRS transmission cycle to measure the MRS and, when necessary, reports a measurement result. In Proposal 1 of the present invention, the UE transmits the SR to report the beam measurement result and monitors the PDCCH to receive a UL grant for reporting, even in the "possible inactive" duration. Alternatively, the UE makes a report about whether to change the best beams or about RSRP (or CQI) for the best beams, through the preconfigured UL channel even in the "possible inactive" duration. If the periodic UL channel for reporting the beam measurement result is configured for the UE, whether to report the measurement result in the "possible inactive" duration during a DRX operation is preconfigured for the UE by the gNB.

Additionally, in the case in which the UE selects a beam different from a serving beam as the best beam during the DRX operation and reports the selected beam, the UE receives and monitors the PDCCH even in the "possible inactive" duration until a serving beam change command is received from the gNB as a response to reporting. The serving beam change command may be directly transmitted to the UE through the PDCCH or may be transmitted to the UE through a MAC message of a PDSCH scheduled through the PDCCH. If the UE configured to perform the DRX operation selects a beam different from the serving beam as the best beam and reports the selected beam, the gNB always transmits, within a predetermined time, the serving beam change command indicating that the serving beam should be changed to the beam reported by the UE.

Specifically, when the UE reports the beam measurement result through the preconfigured periodic UL channel during the DRX operation, if the quality of the serving beam satisfies a predetermined condition, the UE does not monitor the PDCCH during the "possible inactive" duration after reporting the beam measurement result. However, if the quality of the serving beam does not satisfy the predetermined condition, the UE receives and monitors the PDCCH until the serving beam change command is received even during the "possible inactive" duration after reporting the beam measurement result. The predetermined condition may consider the following conditions.

Case 1: Case in which a measurement RSRP of an MRS corresponding to the serving beam is lowered than a measurement RSRP of an MRS of another beam having a maximum RSRP by X dB or more. Herein, X may be preconfigured for the UE by the gNB.

Case 2: Case in which the measurement RSRP of the MRS corresponding to the serving beam is lowered below a predetermined threshold. Herein, the threshold may be preconfigured for the UE by the gNB.

If the measurement result satisfies a specific condition even in the "possible inactive" duration of DRX, the UE transmits an SR to request UL resource allocation for reporting the beam measurement result and monitors the PDCCH to receive a UL grant for reporting the beam measurement result. Herein, Case 1 or Case 2 described above as the conditions for transmitting the SR may be applied. A used condition and a configuration value of a parameter (e.g., X or the threshold) of the condition are separately configured for a DRX operation and a non-DRX operation.

During the DRX operation, a time duration in which the UE is to monitor the PDCCH in order to receive the serving beam change command after reporting the measurement result may be designated. For example, if the UE performs measurement reporting in subframe (SF) #n, the UE may be configured to receive the serving beam change command which might be transmitted by the gNB by monitoring the PDCCH in a time duration from SF #n+K1 to SF #n+K2. Herein, K1 and K2 may be preconfigured for the UE by the gNB. K1 and K2 when the UE is in the DRX operation and K1 and K2 when the UE is not in the DRX operation may be differently configured. For example, when the UE is in the DRX operation, a window in which the PDCCH including the serving beam change command may be transmitted may be set to be small so as to reduce battery consumption of the UE even if scheduling flexibility of the gNB is reduced. If the UE configured to perform the DRX operation reports the beam measurement result in SF #n, the gNB transmits the serving beam change command in a time duration from SF #n+K1 to SF #n+K2.

If the UE fails to receive the serving beam change command during the set window duration, the UE may retransmit a beam measurement report. If the UE fails to receive the serving beam change command even after the UE transmits the beam measurement report as many times as the configured maximum number or retransmissions, the UE performs a beam recovery procedure. The maximum number of retransmissions for beam measurement reporting may be configured and signaled by the gNB.

In Proposal 2 of the present invention regarding beam maintenance during DRX in RRC_CONNECTED, a "DRX cycle" and an "On duration" are configured so that the UE may measure an MRS transmitted during the "On duration" in the DRX mode of the RRC_CONNECTED state. For example, in a system in which the MRS is transmitted at an interval of 5 ms, the "DRX cycle" may be configured as a multiple of 5 ms and a starting timing of the DRX cycle is configured by an offset indicating after how many slots or ms from an MRS transmission timing the DRX cycle is started. The "On duration" is set to be larger than time consumed to transmit MRSs of all beams.

When a periodic UL channel for beam measurement result reporting is configured for the UE, if the UE enters the DRX mode, the UE may be configured to report the measurement result only on a UL resource overlapping with the "On duration" duration.

In Proposal 2, an SR for beam measurement reporting is distinguished from an SR for data transmission and a UL grant transmitted as a response to the SR for beam measurement reporting, i.e., an SR for a resource allocation request for beam measurement reporting, may be limited to be transmitted only during the "On duration". That is, according to Proposal 2, after transmitting the SR for data transmission, the UE in the DRX mode monitors the PDCCH even in a "possible inactive" duration, whereas, after transmitting the SR for beam measurement reporting, the UE in the DRX mode need not monitor the PDCCH in the "possible inactive" duration. In Proposal 2, the gNB transmits the serving beam change command of a specific UE while the UE is in the "On duration".

<Beam Recovery During DRX>

Figure 9:
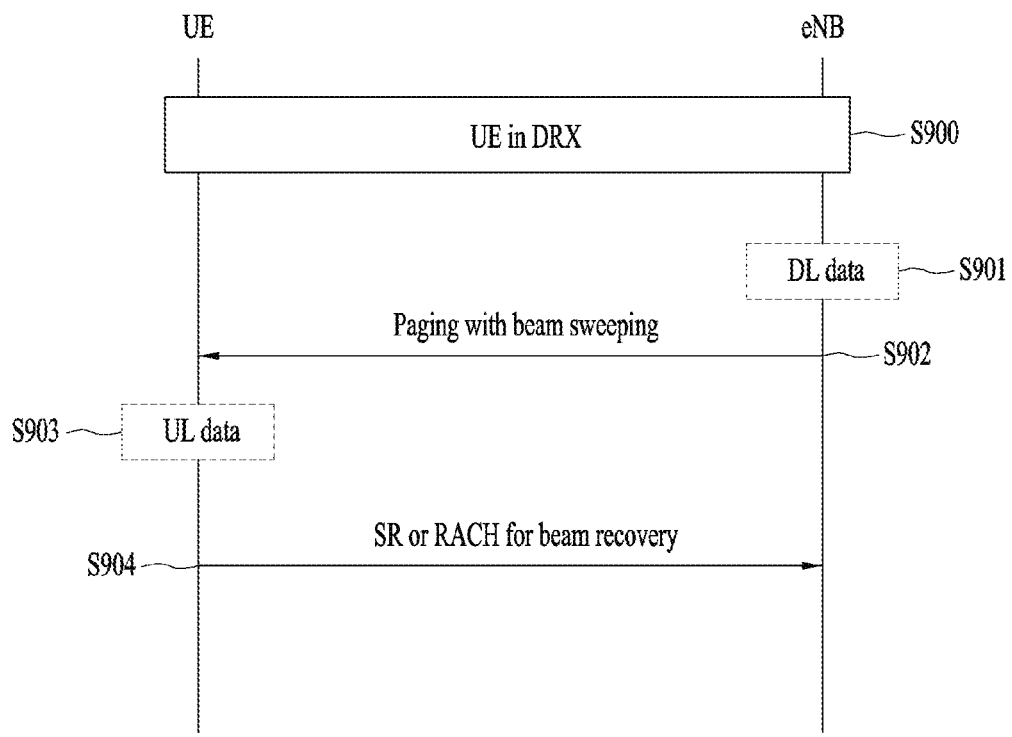
FIG. 9 schematically illustrates a beam recovery procedure according to the present invention.

FIG. 9 schematically illustrates a beam recovery procedure according to the present invention.

Hereinafter, in the case in which the UE in a DRX mode is configured not to perform a beam maintenance procedure in order to minimize power consumption, a beam recovery method of the present invention for reconfiguring a serving beam for communication when data to be transmitted by the gNB or the UE occurs will be described. The beam recovery method according to the present invention may be used in the DRX mode in an RRC_CONNECTED state or in the DRX mode in an RRC_INACTIVE state (S900).

In the present invention, if data to be transmitted by the UE occurs (S903), a "UE initiated beam recovery" procedure is started (S904) and, if data to be transmitted by the gNB occurs (S901), an "NB initiated beam recovery" procedure is started (S902). Hereinafter, the UE always tracks the best beam for possible transmission/reception by performing beam measurement regardless of an "On duration" in the DRX mode.

Beam failure refers to a state in which the UE cannot communicate with all configured serving beams. The present invention proposes beam recovery for triggering beam measurement by the UE or the gNB at a timing when it is determined that beam reporting and serving beam update are needed in a DRX state in which periodic beam reporting is not possible although the UE cannot necessarily perform communication using a serving DL beam. Unlike a beam recovery procedure caused by beam failure triggered when UE cannot communicate with the gNB even using any serving beam configured therefor, the beam recovery procedure of the present invention may be triggered when UL data to be transmitted by the UE occurs or DL data to be transmitted by the gNB occurs in the DRX state of the UE.

UE Initiated Beam Recovery

When data to be transmitted by the UE in the DRX state occurs, if an available UL resource is not present, the UE transmits an SR or an RACH to request UL resource allocation. For example, if data to be transmitted by the UE in the DRX state occurs (S903), the UE transmits the SR through a resource configured for beam recovery (hereinafter, an SR resource) (S904). A plurality of SR resources may be configured per beam of the gNB and the UE transmits the SR through an SR resource connected to a beam of an MRS having the best received quality obtained through MRS measurement. Alternatively, a plurality of SR resources may be configured per synchronization signal (SS) block of the gNB and the UE transmits the SR through an SR resource connected to an SS block having the best received quality obtained through RSRP measurement per SS block. The SS block is transmitted per beam of the gNB. The gNB determines on which SR resource and from which UE the SR has been received at an SR reception timing. To this end, the gNB may previously allocate independent SR resources per UE. If M beams of the gNB are present, the gNB may allocate and signal M SR resources per UE. The SR resources may be distinguished by frequency, time, and a code sequence. That is, SR resources of multiple UEs may be distinguished from each other through frequency division multiplexing (FDM), time division multiplexing (TDM), and code division multiplexing (CDM). The gNB may determine which beam the UE reports as the best beam according to on which resource among the M SR resources allocated to the UE the UE has transmitted the SR. The gNB determines a beam direction for the UE based on information reported by the UE, transmits a UL grant to the UE in the determined beam direction, and causes the UE to perform detailed beam state reporting and/or buffer status reporting. A UL SR channel carrying the SR may be referred to as a random access channel (RACH). Particularly, the gNB may allocate a contention-free RACH resource to the UE so that the UE may use the contention-free RACH resource to indicate that the UE attempts to perform beam recovery when data to be transmitted by the UE occurs in the DRX mode of the UE. The RACH resource for this purpose may be configured to be distinguished from an RACH resource used for initial access or handover. If the RACH resource is used to indicate that the UE attempts to perform beam recovery by the occurrence of data to be transmitted by the UE in the DRX mode, the UE may transmit the RACH by applying a timing advance value accumulated up to now for UL synchronized transmission. This is because, if the UE does not significantly move in an environment in which multiple beams are used, a previously applied timing advance value may be valid. If each UE uses the accumulated timing advance value, more RACH resources may be allocated to the same radio resource. This is generally compared with the case in which the RACH for initial access or handover is transmitted by setting the timing advance value to 0.

The SR or contention-free RACH resource used to indicate that the UE attempts to perform beam recovery by the occurrence of data to be transmitted by the UE in the DRX mode may also be used for beam recovery in a beam failure situation. For example, the SR or the contention-free RACH resource for beam recovery may be allocated to the UE regardless of whether the DRX mode is configured. In a non-DRX mode, the UE may use the configured resource for beam recovery in a beam failure situation and, in a DRX mode, the UE may use the configured resource to indicate that beam recovery is needed due to the occurrence of data to be transmitted.

Although the UE has attempted to perform beam recovery through the SR or contention-free RACH as many times as the predetermined number of times, if the UE fails to obtain a response from the gNB, the UE may perform contention-based transmission to access a corresponding cell again. In this case, the maximum number of transmissions of the SR or the contention-free RACH for beam recovery may be preconfigured for the UE by the gNB.

In the present invention, an SR channel may be divided into two types according to a CP length and an OFDM symbol length. Type I SR channel is defined as a type having the same CP length and the same OFDM symbol length as a PUCCH/PUSCH. This type I SR channel may be transmitted by being FDMed with the PUCCH or the PUSCH. Type II SR channel is defined as a type having the same CP length and the same OFDM symbol length as the RACH. This type II SR channel may be transmitted by being FDMed with the RACH. The type II SR channel may be equal to the afore-described contention-free RACH. Upon allocating the SR channel to the UE, the gNB may designate the type of the SR channel for the UE. Alternatively, both of the two types of SR channels may be configured for the UE. If the two types of SR channels are configured for the UE, the UE may initiate beam recovery using an SR resource of the fastest timing at a timing when beam recovery is determined regardless of the type of the SR.

NB Initiated Beam Recovery

If data to be transmitted by the gNB to the UE which is in the DRX state occurs (S901), the gNB transmits a message or an indicator for requesting serving beam reconfiguration by performing beam sweeping in all beam directions during a time duration in which a target UE is in an "On duration" (S902). In order to enable the gNB to transmit signals using a beam sweeping scheme, a transmission resource may be divided into a plurality of sub-resources in the time domain and the gNB may change a transmission beam direction on each sub-resource in a predetermined order. Since the gNB is not aware of in which beam direction the target UE receiving data is located, the gNB transmits a paging message or indicator for the target UE in all beam directions Specifically, the gNB may transmit the paging message or indicator using the following methods.

Dedicated PDCCH: The PDCCH including a C-RNTI of the target UE is transmitted using the beam sweeping scheme.

Group-specific PDCCH message: A bit field of a specific location of downlink control information (DCI) of a specific RNTI is pre-allocated to the UE (by the gNB). The UE may determine that the UE has been paged upon receiving designated DCI in which a flag of a field allocated thereto is enabled.

Dedicated sequence transmission: A sequence and time and frequency resources on which the sequence is transmitted are allocated to the UE (by the gNB). The UE determines that the UE has been paged upon detecting a designated sequence on a designated resource.

The gNB may pre-inform the UE of at which timing of the "On duration" and in which beam order the paging message or indicator is beam-swept and transmitted. For example, the gNB may divide the transmission resource of the paging message or indicator into a plurality of sub-resources and pre-inform the UE of which MRS transmission beam direction is equal to a transmission beam direction on each sub-resource. Alternatively, the gNB may perform beam sweeping on a transmission resource of the paging message or indicator in the same order as a beam sweeping order on an MRS resource. The UE in the DRX mode periodically measures an MRS to always track the best transmission/reception beam and attempts to detect the paging message or indicator on a sub-resource corresponding to the best Tx beam in the "On duration" to determine whether the gNB has paged the UE.

The gNB may replace the "DRX cycle" and "On duration" configurations with period and offset configurations of the transmission resource for the paging message or indicator. That is, the UE in the DRX mode may be configured to attempt to receive a DL signal only on the transmission resource of the paging message or indicator.

The paged UE, i.e., the UE that has received the paging message or indicator therefor (S902), starts to perform the "UE initiated beam recovery" procedure (S904) and causes the gNB to identify in which beam direction a target UE of the paging message or indicator transmitted by the gNB is located. This is because, if the UE that has received paging transmits an SR/RACH on an SR/RACH resource connected to the best beam direction, the gNB is aware that the UE determines that a beam direction corresponding to the SR/RACH resource on which the SR/RACH is detected is the best beam. The gNB may cause the UE to perform detailed beam state reporting by transmitting a UL grant to the UE in a beam direction determined based on the SR/RACH resource used by the UE for SR/RACH transmission. The gNB initiates DL data transmission through a refined beam based on the beam state reporting from the UE.

Whether to perform "UE initiated beam recovery" through the SR or the contention-free RACH or "UE initiated beam recovery" through the contention-based RACH may be pre-designated for the paged UE by the gNB. Alternatively, both of these two resources may be configured so that the UE may use a UL resource configured at a fast timing to perform "UE initiated beam recovery".

<Beam-Area Maintenance During DRX in RRC_CONNECTED>

When a serving beam is optimally tracked during DRX (see Section <Beam-area maintenance during DRX in RRC_CONNECTED)>), a power saving effect of the UE may be lowered. If the gNB transmits the paging message or indicator in the case in which DL data occurs while the serving beam is not maintained during DRX (see "NB initiated beam recovery"), there is a burden in that DL overhead increases. Therefore, a method of tracking an approximate location of the UE during DRX by the network will be proposed hereinbelow.

A serving beam designated lastly by the gNB and a neighbor beam group centering on the serving beam are designated/configured for the UE which is operating in DRX. If a measurement result satisfies a specific condition, the UE transmits the SR for beam measurement result reporting and monitors a PDCCH to receive a UL grant for the beam measurement result reporting. The following cases may be applied as a condition under which the UE is to transmit the SR.

Case 1: Case in which a maximum value of measurement RSRPs of MRSs corresponding to the serving beam designated lastly for the UE and beams belonging to the neighbor beam group is lower by X dB or more than a maximum value of measurement RSRPs of MRSs corresponding to the other beams. Herein, X may be preconfigured by the gNB.

Case 2: Case in which all measurement RSRPs of MRSs corresponding to the serving beam designated lastly for the UE and beams belonging to the neighbor beam group are lowered below a predetermined threshold. Herein, the threshold may be pre-configured by the gNB.

Herein, the UE may be notified of information about the neighbor beam group for each serving beam by the gNB as system information. Alternatively, upon designating the serving beam, the gNB may individually designate the information about the neighbor beam group for the UE.

To page the target UE, the gNB transmits the paging message or indicator only in a direction of the serving beam lastly designated for the UE and beams belonging to the neighbor beam group.

In the present invention, beam groups may be configured in a disjointed manner (i.e., beam groups may be configured not to have an overlapped beam) or may be configured to be overlapped. If the beam groups are configured in a disjointed manner, the "serving beam and neighbor beam group" may be expressed as a beam group to which the serving beam belongs. The gNB simultaneously transmits a single frequency network (SFN) MRS (SFN-MRS) in the beam group so that the UE may easily be aware of received quality per beam group from a measurement result of the SFN-MRS. If the gNB transmits the SFN-MRS in the beam group, this implies that the gNB simultaneously transmits the same MRS in all beams in the beam group. The UE may acquire representative received quality based on signals received from a plurality of beams.

The gNB may simultaneously transmit an SS block in all beams in a beam group. The gNB may simultaneously transmit the SS block per beam group so that the UE may measure received quality of each beam group from RSRP of an SS in each SS block (e.g., SSS). In the DRX mode, the UE performs only beam management of a broad beam level through the SS block and, in the non-DRX mode, the UE simultaneously performs beam management of a broad beam level through the SS block and beam management of a narrow beam level through a CSI-RS (e.g., received quality measurement per beam based on the CSI-RS).

Figure 10:
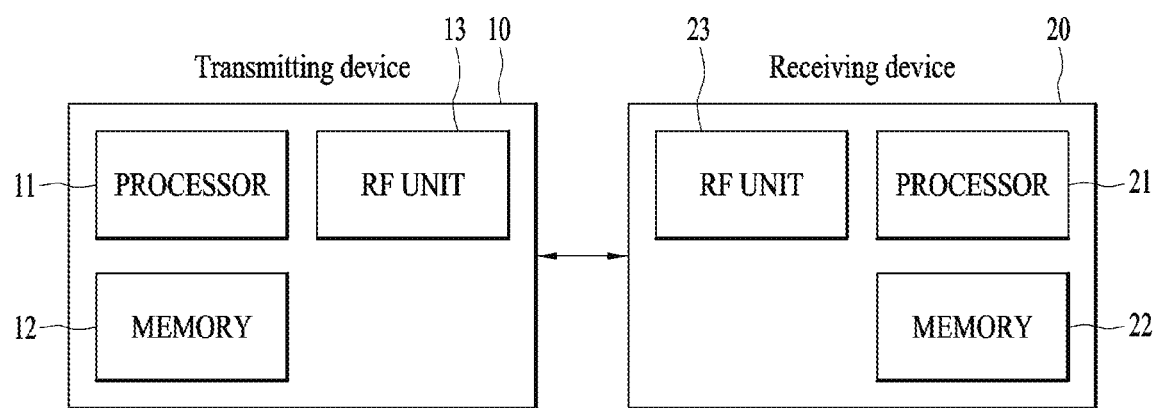
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present invention, the RF units 13 and 23 support Rx BF and Tx BF. For example, in the present invention, the RF units 13 and 23 may be configured to perform the function illustrated in FIG. 2.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

The UE processor of the present invention may be configured to perform beam measurement according to Proposal 1 or Proposal 2 of the present invention. The UE processor may control the UE RF unit to perform measurement for beam maintenance.

The UE processor of the present invention may perform a beam recovery procedure according to a proposal of the present invention. The UE processor may control the UE RF unit to receive configuration information about an SR resource or an RACH resource associated with the beam recovery procedure and control the UE RF unit to transmit an SR/RACH on an SR/RACH resource based on the configuration information upon initiating the beam recovery procedure. The gNB processor of the present invention may control the gNB RF unit to transmit paging to the UE when DL data to be transmitted to the UE by the gNB occurs. The UE processor may initiate the beam recovery procedure according to the "UE initiated beam recovery" procedure of the present invention upon receiving paging for the UE.

The UE processor and the gNB processor of the present invention may control the UE RF unit and the gNB RF unit, respectively, to perform beam-area maintenance according to the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method of performing a beam failure recovery procedure by a user equipment (UE) in a wireless communication system, the method comprising:
   receiving, by the UE from a base station (BS), first configuration information regarding a random access resource for a beam failure recovery;
   detecting, by the UE, a downlink beam failure; and
   performing, by the UE, a contention-free random access (CFRA) procedure for the beam failure recovery on the random access resource, based on detecting the downlink beam failure and based on the first configuration information, wherein the first configuration information includes information regarding a maximum number of attempts for the beam failure recovery, and the method further comprises:
determining whether the number of attempts for the CFRA procedure related to the beam failure recovery reaches the maximum number; and
performing a contention-based random access (CBRA) procedure to perform access to a cell, based on the number of attempts for the CFRA procedure related to the beam failure recovery reaching the maximum number.

2. The method of claim 1,
wherein the random access resource corresponds to an optimal downlink beam measured by the UE among downlink beams.

3. The method of claim 1,
wherein the first configuration information includes information regarding respective random access resources for a plurality of synchronization signal blocks, and
wherein the random access resource is one among the respective random access resources for the plurality of synchronization signal blocks.

4. The method of claim 3, further comprising
performing measurement for the plural synchronization signal blocks,
wherein the random access resource corresponds to a synchronization signal block having highest received power among the plural synchronization signal blocks.

5. The method of claim 1, further comprising:
performing beam measurement for measuring a measurement reference signal per downlink beam; and
transmitting a beam measurement report for reporting a result of the downlink beam measurement using an uplink grant received from the BS.

6. The method of claim 5,
wherein the measurement reference signal per downlink beam is a synchronization signal per downlink beam or a channel state measurement reference signal per downlink beam.

7. A user equipment (UE) for performing a beam recovery procedure in a wireless communication system, the UE comprising,
a radio frequency (RF) transceiver;
a processor; and
a computer memory storing at least one program which, when executed, causes the processor to perform operations comprising:
receiving, through the RF transceiver from a base station (BS), first configuration information regarding a random access resource for a beam failure recovery;
detecting a downlink beam failure; and
performing a contention-free random access (CFRA) procedure for the beam failure recovery on the random access resource, based on detecting the downlink beam failure and based on the first configuration information,
wherein the first configuration information includes information regarding a maximum number of attempts for the beam failure recovery, and the operations further comprise:
determining whether the number of attempts for the CFRA procedure related to the beam failure recovery reaches the maximum number; and
performing a contention-based random access (CBRA) procedure to perform access to a cell, based on a determination that the number of attempts for the CFRA procedure related to the beam failure recovery reaching the maximum number.

8. The method of claim 1, further comprising:
receiving, by the UE, second configuration information regarding random access resources for initial access to the cell,
wherein the first configuration information is distinguished from the second configuration information.

9. The UE of claim 7,
wherein the random access resource corresponds to an optimal downlink beam measured by the UE among downlink beams.

10. The UE of claim 7,
wherein the first configuration information includes information regarding respective random access resources for a plurality of synchronization signal blocks, and
wherein the random access resource is one among the respective random access resources for the plurality of synchronization signal blocks.

11. The UE of claim 10,
wherein the processor is further configured to:
perform measurement for the plural synchronization signal blocks,
wherein the random access resource corresponds to a synchronization signal block having highest received power among the plural synchronization signal blocks.

12. The UE of claim 7,
wherein the processor is further configured to:
perform beam measurement for measuring a measurement reference signal per downlink beam; and
transmit, through the RF transceiver, a beam measurement report for reporting a result of the downlink beam measurement using an uplink grant received from the BS.

13. The UE of claim 12,
wherein the measurement reference signal per downlink beam is a synchronization signal per downlink beam or a channel state measurement reference signal per downlink beam.

14. The UE of claim 7, wherein the operations further comprise:
receiving, through the RF transceiver, first configuration information regarding random access resources for initial access to the cell,
wherein the first configuration information is distinguished from the second configuration information.

* * * * *